United States Patent [19]

Perchthaler et al.

[11] Patent Number: 4,460,461
[45] Date of Patent: Jul. 17, 1984

[54] DEVICE FOR THE REGULATION OF A WATER-REMOVING MACHINE

[75] Inventors: Heinz Perchthaler; Rupert Syrowatka; Werner Dietl, all of Graz, Austria

[73] Assignee: Maschinenfabrik Andritz Aktiengesellschaft, Austria

[21] Appl. No.: 84,444

[22] Filed: Oct. 12, 1979

[30] Foreign Application Priority Data

Oct. 27, 1978 [AT] Austria .............................. 7677/78

[51] Int. Cl.³ .................................................. B01D 33/34
[52] U.S. Cl. ..................................... 210/104; 210/121; 210/143
[58] Field of Search ................. 210/86, 97, 121, 103, 210/104, 128, 126, 134, 142, 143, 101

[56] References Cited

U.S. PATENT DOCUMENTS

| | | | |
|---|---|---|---|
| 3,012,156 | 12/1961 | Simmons | 210/142 |
| 3,960,726 | 6/1976 | Peterson | 210/86 |
| 4,040,954 | 8/1977 | Chandler | 210/86 |
| 4,142,971 | 3/1979 | Le Fur et al. | 210/86 |

FOREIGN PATENT DOCUMENTS

| | | | |
|---|---|---|---|
| 2306704 | 4/1974 | Fed. Rep. of Germany | 210/143 |
| 346147 | 11/1972 | U.S.S.R. | 210/121 |

Primary Examiner—Ivars C. Cintins
Attorney, Agent, or Firm—James E. Bryan

[57] ABSTRACT

This invention relates to a device for regulating a water-removing or drainage machine, particularly a double-sieve sludge drainage machine having a plurality of automatic control means for adaptation thereof to sludges with different drainage properties, comprising an automatic throughput control means in which a sludge level in a filtering zone serves as an indication for the automatic throughput control means, an automatic flocculant control means adapted to employ shearing strength of a sludge-flocculant mixture as an indication of drainage behavior, and an automatic sieve velocity control means responsive in dependence upon drainage velocity.

2 Claims, 1 Drawing Figure

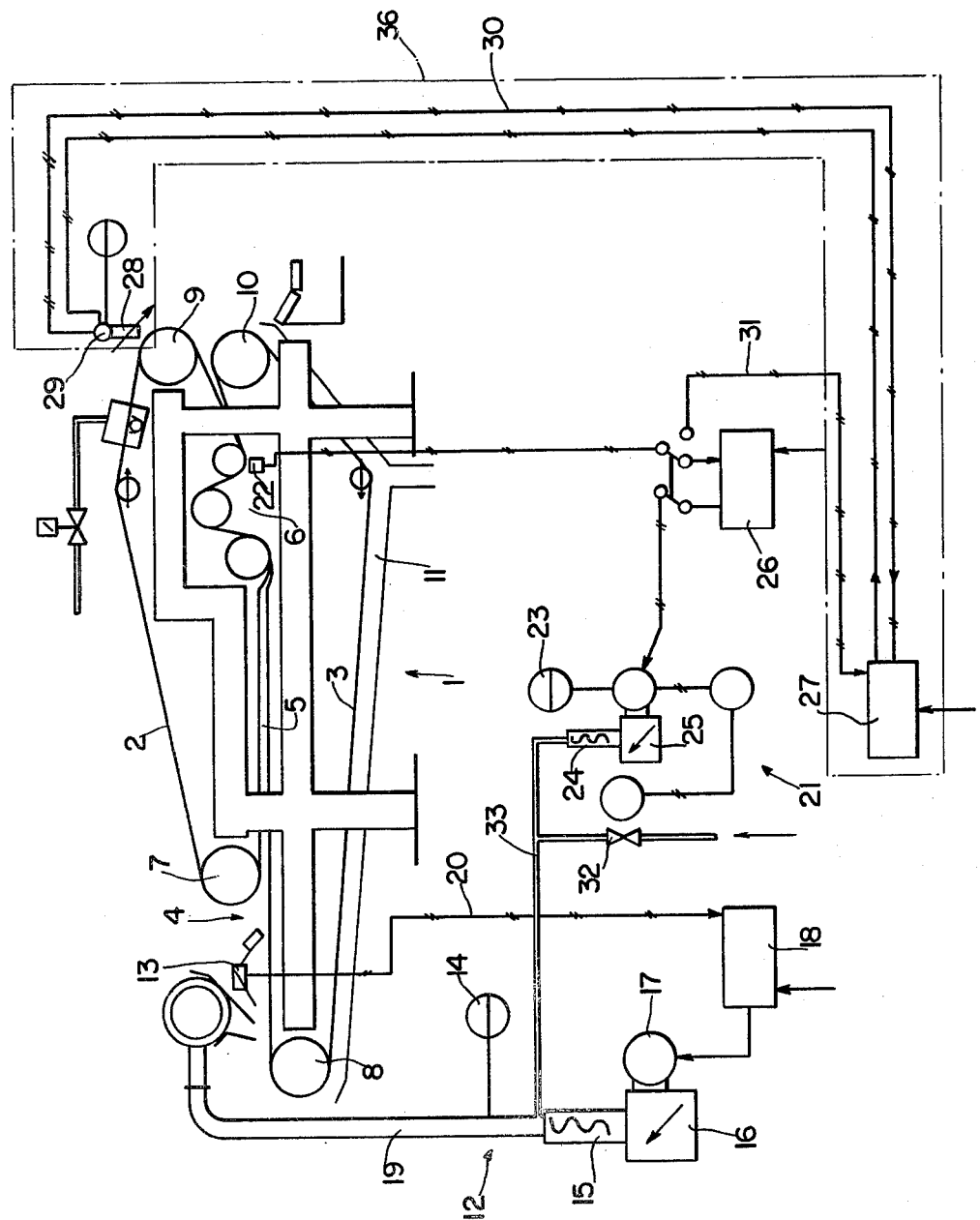

DEVICE FOR THE REGULATION OF A WATER-REMOVING MACHINE

The present invention relates to a device for the regulation of a water-removing machine, particularly a double-sieve sludge drainage machine, having several automatic control systems for adaptation to sludges with different drainage properties.

It is the purpose of this device to largely automate the operating parameters of a double-sieve sludge drainage machine. As is well known, the water-removing or drainage properties of a sludge change constantly in practice, and also the requirements with respect to the water-removing or drainage operation vary constantly so that a manual adjustment of the drainage machine is consistently required.

It is known in the art to so regulate drainage machines—as is apparent from German Pat. No. 1,561,643—that an attempt is made to maintain the development of pressure on the sheet of material constant as much as possible even though the consistency of the latter changes continuously. Thus, one strives to obtain a uniformly dehydrated or drained sheet of material, whereby as a solution a variation of the setting angle of a pressure plate in the wet part is intended to lead to the desired aim. It is disadvantageous in this construction that, on the one hand, the required setting operations must be made by hand and, on the other hand, that the influence of the various compositions and chemical additives is not taken into consideration so that the success which is actually attained is very modest.

Another device for regulating the water-removing pressure in such water-removing machines has been proposed, which is evident from AT Pat. No. 315,633. In this case, mutually independent stretching means are provided for the sieves which have the effect that the sieves are variously strongly tightened and, in conjunction with the lip angle or cutting wedge displacement, exert an influence upon the suspension to be dehydrated. While this construction did represent a certain advance in the automation of the process of the drainage procedure, further regulating components for the complete automation—which would have an influence both upon the respectively existing suspension and also upon the chemical additives, such as flocculating agents and the like—are lacking therein.

It is known that, in double-sieve sludge drainage machines, different operating parameters are responsible for an optimum drainage operation, which operating parameters result from the sludge volume that is to be drained or dehydrated, and the pump throughput, and are further composed of the volume of the flocculating agent being added to the sludge, as well as of the velocity of the drainage sieves, and finally of the pressure which is exerted upon the press cake.

The present invention was conceived with the goal of providing a device for regulating a drainage or water-removing or dehydrating machine in which the aforementioned operating parameters are regulatable and co-act in such a manner that an optimum utilization of the machine is guaranteed, and wherein it is immaterial at which precise instant the suspension to be drained or dehydrated arrives in the machine. For this purpose, one makes use preferably of a double-sieve sludge drainage machine in which there are several automatic control systems present for the adaptation thereof to the respectively existing sludges.

This object is obtained, in accordance with the present invention, by virtue of the fact that there are present an automatic throughput control system, an automatic flocculant control system, and an automatic sieve velocity control system in which systems the sludge level in the filtering zone serves as an indication of the automatic throughput control system, the flocculant control system uses as an indication of the drainage behavior the shearing strength or resistance of the sludge flocculant, and the sieve velocity control system is responsive in dependence upon the drainage velocity.

Achieved by means of this regulating device is the fact that the operations in the drainage machine are optimized and there is a minimum consumption of additives. The particular advantage of the present invention must be considered as residing in the fact that there is no need for any service personnel to effect a correction.

The present invention will be further explained hereinbelow in one embodiment thereof with reference to the accompanying drawing, wherein the single FIGURE thereof is a schematic representation of a drainage machine with the regulating devices appertaining thereto.

As is apparent from the FIGURE, a double-band press 1 has been chosen as the sludge drainage machine, which is constructed in known manner. An upper sieve band 2 is guided over the upper reversing rollers 7 and 9, and the lower sieve band 3 moves around the reversing rollers 8 and 10. On the left-hand side, the lower sieve band with the roller 8 is pulled slightly forwardly toward the left so that there remains sufficient impact surface for the material take-up 4. The wedge section 5 is provided adjacent thereto. Thereby, the distance between the two sieve bands 2, 3 is gradually reduced so that the gravitational drainage having already taken place at the material take-up 4 is followed by another drainage operation. Disposed at the end of this wedge part 5 is the main pressing section 6, whereby the sieve bands 2, 3 with the interposed suspension are guided around the pressing rollers and over several reversing rollers. At that time the filter cake is further compressed and discharged from the machine at the position of the reversing roller 9, 10. Disposed under the double-band press 1 is the collector tray 11 from which the collected water is carried off.

Connected to this double-band press 1 are the different automatic control systems, and they are composed of the automatic sludge throughput control system 12, the automatic flocculant control system 21, and the automatic sieve velocity control system 36.

The regulation or control is composed of two automatic control systems acting independently of each other, whereby the automatic sludge throughput control system 12 is composed of the actual value indicator, to which there is connected a throughput quantity gauge 14 with a sludge pump. A control gear system 16 which is infinitely variable controls the supply or feed of the suspension quantity. The control gear system 16 is driven by way of a servomotor 17. An electronic regulator 18 effects the corresponding dosage. The supply or feed is effected from the control gear system 16 by way of the sludge pump 15 by means of the supply or feed line 19 to the material take-up 4. A control line 20 transmits the values of the indicator 13.

The automatic throughput control system 12 is composed of a float and communicates the actual value of the sludge level in the filtering zone (material take-up 4) to an electronic regulator 18. The latter compares the level with the theoretical value having been once set by hand and adjusts by way of the servomotor 17 the velocity displacement of the sludge pump 15 and the sludge amount. This regulation or control assures that the drainage wedge which is determinative for the sludge throughput is optimally filled at all times. If, for instance, the drainage behavior of the sludge should be impaired, a reflux of the sludge within the wedge will occur, and therewith a backwash in the filtering zone. The sludge level is temporarily raised and re-set by means of the regulator to the original level by reducing the sludge throughput. The reverse will occur in case of an improvement of the drainage properties, or in the case of variations of the sludge consistency.

Further connected to the machine is the automatic flocculant control system 21 which also contains an indicator 22 for the drainage condition of the sludge cake. This indicator 22 is installed directly under the last press roller of the main pressing section 6. A throughput quantity gauge 23 doses the quantity of flocculant, in that it controls the flocculant pump 24 by way of an infinitely variable control gear system 25 and an electronic regulator 26.

The automatic flocculant control system 21 assures that the drainage takes place with a minimum amount of flocculant. If the amount of flocculant is decreased, the drainage behavior will deteriorate, as is well known in the art. As a consequence thereof, the water content in the sludge cake will increase, and the mechanical shearing strength or resistance thereof will decrease. This resistance value is an indication of the drainage behavior of a sludge-flocculant mixture for a specific sludge. When this shearing resistance of the sludge cake is no longer sufficient to prevent relative movements prior to the filtering operation, an undesirable malfunction will ensue.

The operation of the flocculant regulation is based on the following considerations. Immediately prior to the entry into the pressing zone, the wedge as the lateral sealing element for the press cake is eliminated. In order to be able to withstand the pressing effect, the press cake is slightly horizontally pressed. When thereupon a deterioration of the drainage behavior occurs, the press cake will have a greater water content and will be more strongly pressed or spread out laterally. This cake spread or expansion which thus is an indication for the drainage behavior is converted by means of an either mechanical or electronic key into an electrical signal, which represents the actual value of the automatic control system. In the case of deviations from the theoretical value, the flocculant addition is regulated by way of the regulator and the servomotor of the flocculant pump.

The automatic sieve velocity control system 36, in turn, is composed again of a regulating device 27 with a sieve drive 28 and the respectively coordinated servomotor 29 which may be controlled by way of the control line 30 and the regulating line 31. The water supply is varied by way of a reduction valve 32 with the respectively coordinated drive and by way of the water main 33.

The automatic sieve velocity control system 36 whose setting encompasses various operating conditions effects a mean throughput quantity or amount during normal operation thereof at a preselected level in the filtering zone and at a constant sieve velocity. The amount of flocculant is thus reduced to a minimum. The reason for this setting must be considered as residing in the goal of achieving, with a normal throughput, operating costs that are as low as possible.

When it is desired to have the machine work at a minimum operation, the sieve velocity is set to a preselected low value. By means of the automatic sludge throughput control system 12, the sludge throughput will be automatically reduced. The automatic flocculant control system 21 will then assure a minimum consumption of flocculant.

If, on the other hand, a maximum operation of the machine is called for, the indicator for the drainage condition is switched to the automatic sieve velocity control system 36. At the same time, the automatic flocculant control system 21 also increases the throughput value of the flocculant. Achieved therewith for the highest possible sieve velocity is the greatest possible sludge throughput.

It will be obvious to those skilled in the art that many modifications may be made within the scope of the present invention without departing from the spirit thereof, and the invention includes all such modifications.

What is claimed is:

1. A device for regulating a water-removing or drainage machine, particularly a double-sieve sludge drainage machine having a plurality of automatic control means for adaptation thereof to sludges with different drainage properties, comprising an automatic throughput control means in which a sludge level in a filtering zone serves as an indication for the automatic throughput control means,
   an automatic flocculant control means adapted to employ shearing strength of a sludge-flocculant mixture as an indication of drainage behavior,
   and an automatic sieve velocity control means responsive in dependence upon drainage velocity.

2. A device according to claim 1 including float means for determining the sludge level in the filtering zone,
   mechanical or electronic key means for detecting the shearing strength of a press cake in a pressing zone,
   and servomotor means for varying an infinitely variable sieve drive.

* * * * *